US 7,900,763 B2

(12) United States Patent
Paumier et al.

(10) Patent No.: US 7,900,763 B2
(45) Date of Patent: Mar. 8, 2011

(54) DEVICE FOR COUPLING A ROTOR OF A ROTATING ELECTRICAL MACHINE WITH THE GEARBOX PRIMARY SHAFT OF A MOTOR VEHICLE HEAT ENGINE

(75) Inventors: Alain Paumier, Maintenon (FR); Thomas Boutou, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 625 days.

(21) Appl. No.: 11/815,211

(22) PCT Filed: Jan. 31, 2006

(86) PCT No.: PCT/FR2006/050074
§ 371 (c)(1),
(2), (4) Date: Jul. 31, 2007

(87) PCT Pub. No.: WO2006/082335
PCT Pub. Date: Aug. 10, 2006

(65) Prior Publication Data
US 2008/0139323 A1 Jun. 12, 2008

(30) Foreign Application Priority Data
Feb. 1, 2005 (FR) ..................................... 05 00992

(51) Int. Cl.
*B60K 6/26* (2007.10)
*B60K 6/40* (2007.10)
(52) U.S. Cl. ............... 192/85.51; 192/89.23; 192/110 S; 403/359.1; 310/78; 903/912; 180/65.21

(58) Field of Classification Search ............... 192/110 S, 192/89.23, 85.51; 403/359.1, 359.4, 359.6; 903/912, 914; 310/78, 92, 100
See application file for complete search history.

(56) References Cited

U.S. PATENT DOCUMENTS 228,770 A * 6/1880 Tourneau ....................... 131/304
2,228,770 A * 1/1941 Le Tourneau ................. 403/334
(Continued)

FOREIGN PATENT DOCUMENTS
FR 2828141 A 2/2003
(Continued)

OTHER PUBLICATIONS
International Search Report mailed Jul. 6, 2006 in PCT/FR2006/050074.

*Primary Examiner* — David D Le
*Assistant Examiner* — Terry Chau
(74) *Attorney, Agent, or Firm* — Nicolas E. Seckel

(57) ABSTRACT

The invention concerns a device for coupling a rotor of a rotating electrical machine with the gearbox primary shaft of a motor vehicle heat engine. The device is characterized in that the hub (7) of the rotor (6) is coupled with the primary shaft (8) by a mating part (25) comprising an externally toothed crown (26) meshing in the hub (7) and a central sleeve (27) coupled with the primary shaft (8) through a splined connection (28) and in that ends (29) and (30) of the toothed crown (26) and of the central sleeve (27) of the part (25) are centered respectively in the hub (7) and on the primary shaft (8) in sliding arrangement. The invention is applicable in the automotive industry.

13 Claims, 2 Drawing Sheets

U.S. PATENT DOCUMENTS

| | | | |
|---|---|---|---|
| 3,907,085 A * | 9/1975 | Rist | 192/91 A |
| 4,509,381 A * | 4/1985 | Ikemoto et al. | 74/413 |
| 5,158,390 A * | 10/1992 | Ito et al. | 403/282 |
| 5,829,135 A * | 11/1998 | Koneda et al. | 29/892.11 |
| 6,364,042 B1 * | 4/2002 | Joachim | 180/65.25 |
| 6,655,484 B2 * | 12/2003 | Levin | 180/65.25 |

FOREIGN PATENT DOCUMENTS

| | | |
|---|---|---|
| FR | 2828141 A1 * | 2/2003 |
| FR | 2830305 A | 4/2003 |
| FR | 2837246 A | 9/2003 |
| FR | 2837248 A | 9/2003 |

* cited by examiner

DEVICE FOR COUPLING A ROTOR OF A ROTATING ELECTRICAL MACHINE WITH THE GEARBOX PRIMARY SHAFT OF A MOTOR VEHICLE HEAT ENGINE

The present invention concerns a device for coupling the rotor of a reversible rotating electrical machine with the main shaft of the gearbox of a heat engine of a motor vehicle hybrid drive train.

Such a device is known in which the rotor of the electrical machine is integral with a hub mounted concentrically with the main shaft of the gearbox and rotationally with respect to a stationary case housing the stator of the electrical machine, the stator and the rotor being coaxial and a gap being defined between the inner periphery of the stator and the outer periphery of the rotor.

The main shaft is rotationally mounted at its gearbox end via a rolling bearing in the oil bath of the gearbox, and its opposite end is also rotationally mounted in a blind hole provided at the end of the crankshaft of the heat engine.

The main shaft is also coupled to the crankshaft through a clutch that can be disengaged by a clutch release control so as to change from a clutch engaged position, in which the rotation of the crankshaft is transmitted to the main shaft, to a clutch released position, in which the crankshaft is uncoupled from the main shaft, when changing gear ratios or when the engine is operating in electrical mode.

The rotor hub of the electrical machine includes a sleeve mounted on the main shaft and rotationally coupled to it through a splined connection.

The transmission of torque from the electrical machine to the main shaft of the gearbox via an unlubricated splined connection requires a clearance between the rotor hub sleeve and the main shaft to ensure that the sleeve is mounted on this shaft via the splines. When the main shaft rotates under torque in a dry environment, that is, without oil, such a connection produces micro-movements between the sleeve of the rotor hub and the main shaft, which can lead to significant wear from abrasion, known as "fretting corrosion", on the connecting splines between these two parts, causing the splines to become dull over time and the splined connection to fail.

The purpose of the present invention is to eliminate the disadvantage described above by proposing a coupling device between the rotor of a reversible rotating electrical machine and the main shaft of the gearbox of a heat engine of a motor vehicle hybrid drive train, the rotor being integral with a hub mounted concentrically with the main shaft and rotationally with respect to a stationary case housing a stator of the electrical machine, defining a gap between it and the rotor, the main shaft being able to be rotationally uncoupled from the engine crankshaft through a clutch that can be disengaged by a clutch release control, the device being characterized in that the rotor hub is coupled to the main shaft with a coupling part comprising an externally toothed ring gear meshing inside the rotor hub and a central sleeve mounted directly on the main shaft while being coupled to it via a splined connection, and in that the toothed ring gear and the central sleeve of the coupling part have their two cylindrical ends, which are opposite the connections coupling them to the rotor hub and to the main shaft, centered in the rotor hub and on the main shaft, respectively, via a slip fit or sliding fit.

The two ends of the toothed ring gear and of the central sleeve of the coupling part, which are centered in the rotor hub and on the main shaft, are located on a same side parallel to the main shaft.

The coupling part is translationally blocked with respect to the rotor hub and the main shaft, firstly by a stop shoulder built into the toothed ring gear between the smooth end of the toothed ring gear and the adjacent ends of the teeth of the rotor hub, so that the ends of these teeth bear against the stop shoulder of the toothed ring gear, and secondly, by a stop shoulder on the main shaft adjacent to its splines connecting it with the central sleeve, and against which the inner splines of the central sleeve bear.

The clutch release control makes it possible to apply pressure on ends of at least two cylindrical push rods slidingly mounted so as to be guided parallel to the main shaft through a wall transverse to this shaft connecting the toothed ring gear to the central sleeve of the coupling part, in order to elastically move a clutch diaphragm via a pressure ring that is integral with the ends of the push rods opposite their ends actuated by the clutch release control, in order to move this diaphragm into its clutch release position.

The ends of the push rods opposite the pressure ring that moves the diaphragm are integral with a substantially circular plate perpendicular to the main shaft and having a center hole coaxially surrounding this shaft, on which circular plate bears the clutch release bearing.

The clutch release control acts on three push rods that go through three respective holes in the transverse wall of the coupling part, equally spaced from one another circumferentially at a 120° angle.

The circular plate is secured to the ends of the push rods with retainer screws, and the pressure ring that moves the diaphragm is secured to the opposite ends of the push rods, also with retainer screws.

The clutch release control is hydraulic.

The invention will be more easily understood, and other purposes, characteristics, details and advantages thereof will become clearer in the following explanatory description, written with reference to the attached drawings, which are given only as an example illustrating an embodiment of the invention and in which.

Figure 1:
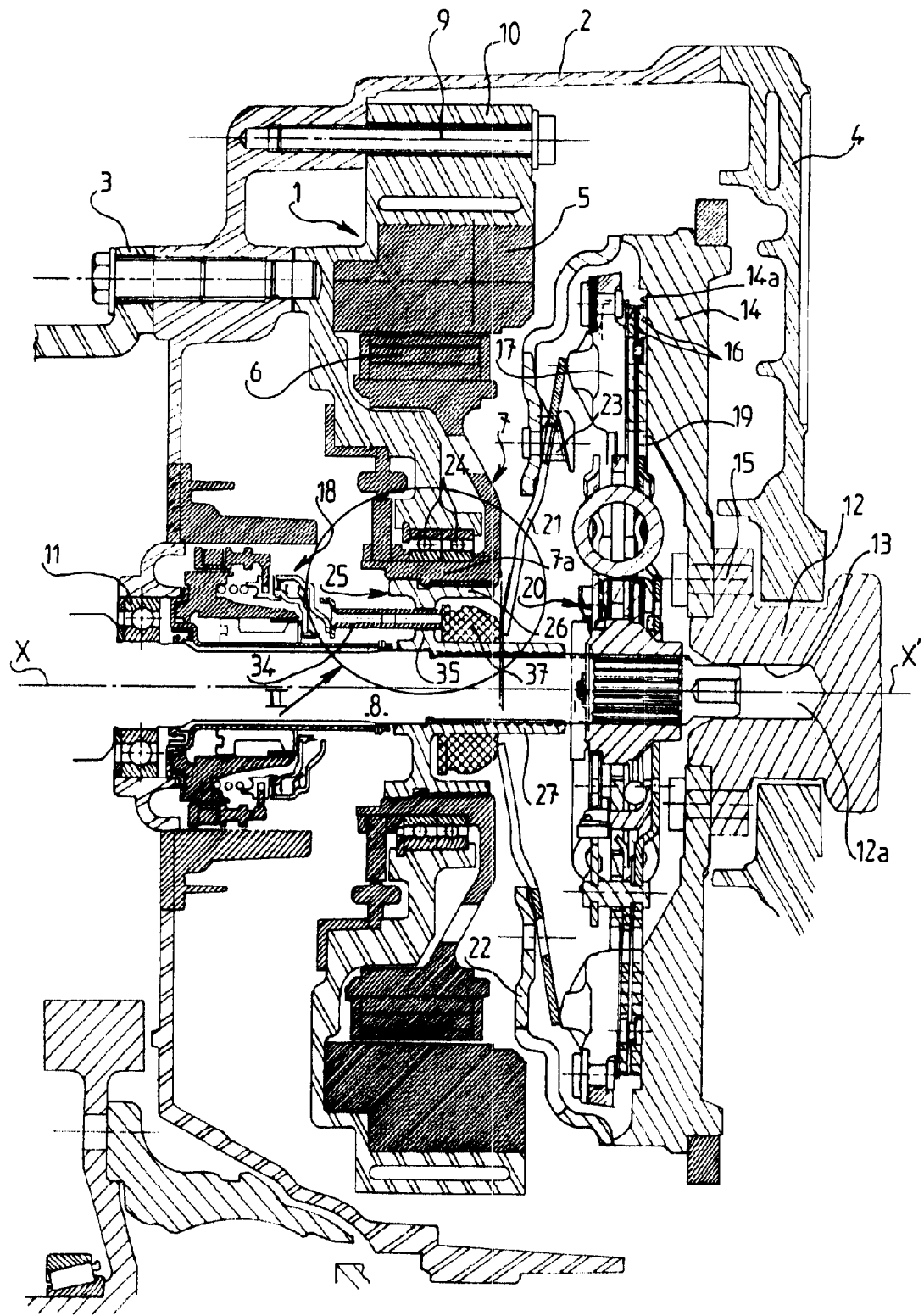
FIG. 1 is a longitudinal cross-section view representing a reversible rotating electrical machine in accordance with the invention and forming part of a motor vehicle hybrid drive train.

Referring to the figures, reference 1 indicates a reversible rotating electrical machine housed in a clutch housing 2 that is secured between the gearbox housing 3 and the heat engine crankcase 4 of a motor vehicle.

The electrical machine 1, which is part of a hybrid drive train, essentially comprises a fixed stator ring 5 and a rotor ring 6 housed coaxially in the fixed stator 5 along an axial symmetry axis X-X' around which the rotor 6 is rotatably mounted.

A gap is defined between the inner periphery of the stator 5 and the outer periphery of the rotor 6.

The rotor 6 is integrally mounted on a support hub 7 positioned concentrically around a main shaft or entry shaft 8 of the gearbox extending along the X-X' axis and is rotationally mounted to this shaft, as will be seen later.

The stator 5 is secured to the clutch housing 2 with retainer screws 9, of which only one is shown, that go through a frame or housing into which the outer periphery of the stator 5 is fitted.

The main shaft 8 is rotationally mounted at its gearbox end via an anti-friction bearing 11 and mounted via a bush bearing 13 off center in a blind hole 12a provided at the end or nose-forming part of the crankshaft 12 of the heat engine.

A flywheel 14 is secured to the crankshaft 12 with retainer screws 15 and has a face 14a set perpendicular to the crankshaft 12 on which can frictionally engage at least one clutch friction disk 16 whose axial movement is controlled by a plate 17. The latter is controlled by a clutch release bearing 18 and the clutch disk 16 is connected by a flexible coupling 19 to a hub 20 that is rotationally integral with the main shaft 8 via splines, for example.

The clutch plate 17 is controlled by a diaphragm 21 mounted concentrically with the main shaft 8 and guided by the bearing 18 to make the clutch, consisting of the disk 16 and the plate 17, engage with or disengage from the flywheel 14 and consequently, to couple the main shaft 8 to the crankshaft 12 or to uncouple it therefrom when changing gear ratios or when the engine is operating in electrical mode. The diaphragm 21, in the form of an elastically deformable membrane, is positioned between the plate 17 and a clutch cover 22, the diaphragm 21 being secured to the cover 22 with rivets 23 evenly spaced on a same circumference near the outer edge of the diaphragm 21.

According to the invention, the hub 7 of the rotor 6 has its central sleeve 7a, which, firstly, at its outer periphery is rotationally mounted with respect to the housing 10 of the stator 5 with ball bearings 24, and secondly, is rotationally coupled to the main shaft 8 via a coupling part 25.

The coupling part 25 comprises an externally toothed ring gear 26 meshing in the central sleeve 7a of the hub 7 of the rotor 6, and a central sleeve 27, coaxial with the toothed ring gear 26, mounted directly onto the main shaft 8, being rotationally coupled to it via a splined connection 28.

The toothed ring gear 26 has a cylindrical end 29 extending opposite its peripheral teeth and concentric with the main shaft 8, the outer periphery of which is smooth for a sliding fit into the smooth inner bore portion of the sleeve 7a of the hub 7 on the end opposite the inner periphery of this sleeve that has the inner teeth in mesh with those of the toothed ring gear 26.

Likewise, the sleeve 27 of the coupling part 25 has its end opposite the splined connection 28 shaped like a cylinder 30, the smooth inner periphery of which is slidingly fitted over a corresponding portion of outer smooth periphery of the main shaft 8 opposite its outer radial splines.

ISO standard H7/g6 is the type of fit preferable between the bore portion of the sleeve 7a and the cylindrical end 29 of the toothed ring gear 26, as well as between the bore hole defined by the cylindrical end 30 and the corresponding smooth portion of the main shaft 8.

The two ends 29, 30 of the toothed ring gear 26 and of the central sleeve 27 of the coupling part 25 are located on a same side parallel to the main shaft 8.

The coupling part 25 is translationally blocked with respect to the sleeve 7a of the hub 7 of the rotor 6 and with respect to the main shaft 8, firstly by a stop shoulder 31 built into the toothed ring gear 26 between the cylindrical end 29 of the ring gear 26 and the ends adjacent to the inner teeth of the sleeve 7a of the hub 7, so that when the coupling part 25 is fitted in the sleeve 7a, the ends of these teeth bear against the stop shoulder 31, and secondly, by a stop shoulder 32 on the main shaft 8 adjacent to the splines connecting it with the central sleeve 27, and against which stop shoulder 32 the inner splines 33 of the central sleeve 27 bear.

Assembly proceeds as follows:
the main shaft 8 is fitted into the gearbox,
the coupling part 25 is fitted onto the main shaft 8 until it bears against the stop shoulder 32,
then the hub 7 of the electrical machine is fitted onto the coupling part 25 until it bears against the stop shoulder 31.

Having a sliding fit between the cylindrical end 29 of the ring gear 26 and the sleeve 7a of the hub 7 of the rotor 6, as well as between the cylindrical end 30 and the main shaft 8, accomplishes the task of centering these parts as a separate function from the torque transmission function between them. This way, the radial micro-movements are subdued between the toothed ring gear 26 and the sleeve 7a of the hub 7, as well as between the central sleeve 27 and the main shaft 8, which consequently eliminates the problems of wear on the teeth and the splines of these parts.

The clutch release control 18, known in itself, which is, for example, hydraulic, is secured in the clutch housing 2 on the gearbox side, that is, opposite the clutch. It is designed to act on the ends of at least two cylindrical push rods 34 mounted so as to slide parallel to the main shaft 8 through a wall 35 extending transversally to the main shaft 8 and connecting the toothed ring gear 26 to the central sleeve 27 of the coupling part 25, which is thus embodied as one piece.

Preferably, there are three sliding rods 34 that are guided through three respective holes 36 in the wall 35 equally spaced from one another circumferentially at a 120-degree angle.

On the ends of the push rods 34 opposite the ends actuated by the clutch release control 18 is a pressure ring 37 that bears against the area near the edge of the center hole of the diaphragm 21, which concentrically surrounds the central sleeve 27 of the coupling part 25. The pressure ring 37 is mounted concentrically with the main shaft 8 and is in sliding contact on the central sleeve 27, which thus ensures that the pressure ring 37 is translationally guided in its movements to disengage and engage the clutch.

The pressure ring 37 is secured to the corresponding ends of the push rods 34 with retainer screws 38, for example, and a circular plate 39 with a center hole 40 that concentrically surrounds the main shaft 8 is secured to the opposite ends of the push rods 34 with retainer screws 41. The circular plate 39 extends perpendicular to the longitudinal axis of the main shaft 8.

Figure 2:
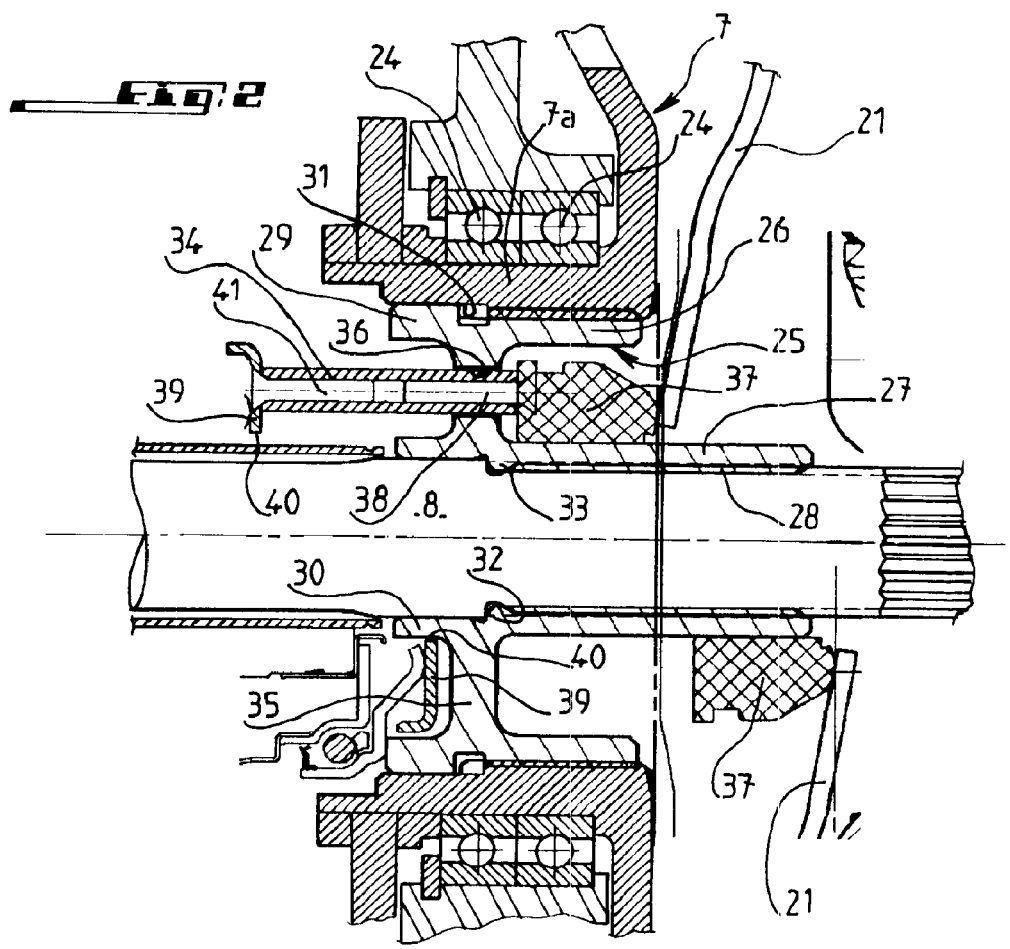
FIG. 2 is an enlarged view of the part circled in II of FIG. 1.
Figure 3:
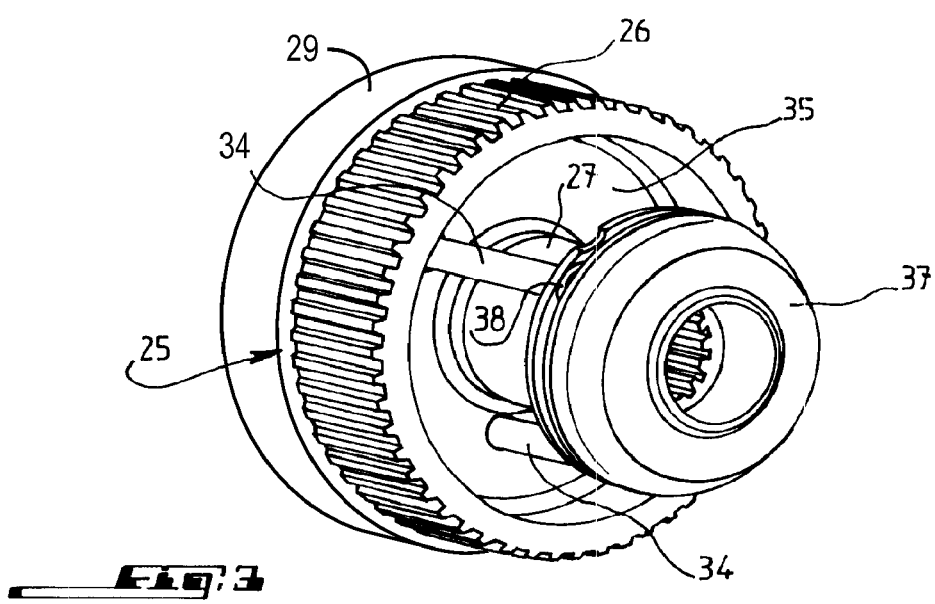
FIG. 3 is a perspective view of a coupling part according to the invention.

The top half of FIG. 2 shows that the push rods 34 and the pressure ring 37 are in an engaged position of the clutch mechanism, whereas the bottom half of this figure shows that the clutch release control 18 has been guided so as to move the push rods 34 and the pressure ring 37 translationally to a disengaged position of the clutch mechanism.

The coupling part 25, then, makes it possible firstly to ensure the transmission of torque from the electrical machine 1 to the main shaft 8 via toothed and splined connections, and secondly, to guide the push rods that ensure engagement and disengagement of the clutch mechanism via the clutch release control and the pressure ring located at the ends of these rods.

The invention claimed is:

1. Coupling device between a rotor of a reversible rotating electrical machine and a main shaft of a gearbox of a heat engine of a motor vehicle hybrid drive train,
the rotor being integral with a hub mounted concentrically with the main shaft and rotatable with respect to a stationary case housing a stator of the electrical machine, defining a gap between the stator and the rotor,
the main shaft being able to be rotationally uncoupled from the engine crankshaft via a clutch that can be disengaged by a clutch release control,
wherein the hub of the rotor is coupled to the main shaft via a coupling part comprising (i) an externally toothed ring gear meshing inside the hub of the rotor, and (ii) a central sleeve mounted directly on the main shaft while being coupled to the main shaft via a splined connection, wherein each of the toothed ring gear and the central sleeve of the coupling part has a respective cylindrical end having a smooth peripheral surface, wherein the two cylindrical ends are located opposite the respective teeth and splines coupling the coupling part to the hub of the rotor and to the main shaft, and wherein each of the hub of the rotor and the main shaft has a respective smooth cylindrical surface facing the respective smooth peripheral surface of the respective cylindrical end of the ring gear and the central sleeve, so that the cylindrical ends of the ring gear and of the central sleeve are centered in the hub of the rotor and on the main shaft, respectively, via a slip fit or sliding fit, wherein the main shaft has a stop shoulder, and the central sleeve bears on the stop shoulder of the main shaft, so that the coupling part is translationally blocked in a first direction with respect to the main shaft, and wherein the toothed ring gear has a stop shoulder, and the hub of the rotor bears on the stop shoulder of the ring gear, so that the coupling part is translationally blocked in a second direction opposite the first direction with respect to the rotor.

2. Device according to claim 1, wherein the smooth surfaces of the toothed ring gear and of the central sleeve of the coupling part, which are centered respectively in the hub of the rotor and on the main shaft, are located on a same side of the coupling part along the main shaft.

3. Device according to claim 2, wherein (i) the stop shoulder on the main shaft is located adjacent to its splines connecting it with the central sleeve and between its splines and its smooth cylindrical surface, and the splines of the central sleeve bear on the stop shoulder of the main shaft, and (ii) the stop shoulder of the toothed ring gear is located adjacent its teeth connecting it with the hub of the rotor and between its teeth and its smooth cylindrical surface, and the teeth of the hub of the rotor bear on the stop shoulder of the ring gear.

4. Device according to claim 3, wherein (i) the splines of the central sleeve protrude radially with respect to the smooth cylindrical surface of the central sleeve to bear on the stop shoulder of the main shaft, and (ii) the teeth of the hub of the rotor protrude radially with respect to the smooth cylindrical surface of the hub of the rotor to bear on the stop shoulder of the ring gear.

5. Device according to claim 2, wherein (i) the splines of the central sleeve protrude radially with respect to the smooth cylindrical surface of the central sleeve to bear on the stop shoulder of the main shaft, and (ii) the teeth of the hub of the rotor protrude radially with respect to the smooth cylindrical surface of the hub of the rotor to bear on the stop shoulder of the ring gear.

6. Device according to claim 1, wherein (i) the stop shoulder on the main shaft is located adjacent to its splines connecting it with the central sleeve and between its splines and its smooth cylindrical surface, and the splines of the central sleeve bear on the stop shoulder of the main shaft, and (ii) the stop shoulder of the toothed ring gear is located adjacent its teeth connecting it with the hub of the rotor and between its teeth and its smooth cylindrical surface, and the teeth of the hub of the rotor bear on the stop shoulder of the ring gear.

7. Device according to claim 6, wherein (i) the splines of the central sleeve protrude radially with respect to the smooth cylindrical surface of the central sleeve to bear on the stop shoulder of the main shaft, and (ii) the teeth of the hub of the rotor protrude radially with respect to the smooth cylindrical surface of the hub of the rotor to bear on the stop shoulder of the ring gear.

8. Device according to claim 1, wherein the clutch release control makes it possible to actuate ends of at least two cylindrical push rods slidingly mounted so as to be guided parallel to the main shaft through a wall transverse to this shaft connecting the toothed ring gear to the central sleeve of the coupling part, in order to elastically move a clutch diaphragm via a pressure ring that is integral with the ends of the push rods opposite their ends actuated by the clutch release control, in order to move this diaphragm into its clutch release position.

9. Device according to claim 8, wherein the ends of the push rods opposite the pressure ring that moves the diaphragm are integral with a substantially circular plate perpendicular to the main shaft and having a center hole coaxially surrounding this shaft, on which circular plate bears a clutch release bearing.

10. Device according to claim 8, wherein the clutch release control acts on three push rods that go through three respective holes in the transverse wall of the coupling part evenly spaced from one another circumferentially at a 120° angle.

11. Device according to claim 9, wherein the circular plate is secured to the ends of the push rods with retainer screws, and the pressure ring that moves the diaphragm is secured to the opposite ends of the push rods with retainer screws.

12. Device according to claim 1, wherein the clutch release control is hydraulic.

13. Device according to claim 1, wherein (i) the splines of the central sleeve protrude radially with respect to the smooth cylindrical surface of the central sleeve to bear on the stop shoulder of the main shaft, and (ii) the teeth of the hub of the rotor protrude radially with respect to the smooth cylindrical surface of the hub of the rotor to bear on the stop shoulder of the ring gear.

* * * * *